United States Patent
Atsuta et al.

(10) Patent No.: US 9,383,459 B2
(45) Date of Patent: Jul. 5, 2016

(54) PHOTODETECTOR

(71) Applicant: KABUSHIKI KAISHA TOSHIBA, Tokyo (JP)

(72) Inventors: Masaki Atsuta, Kanagawa (JP); Keita Sasaki, Kanagawa (JP); Hitoshi Yagi, Kanagawa (JP); Rei Hasegawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/640,828

(22) Filed: Mar. 6, 2015

(65) Prior Publication Data

US 2015/0268361 A1 Sep. 24, 2015

(30) Foreign Application Priority Data

Mar. 18, 2014 (JP) .................................. 2014-054399

(51) Int. Cl.
*G01T 1/24* (2006.01)
*G01T 1/20* (2006.01)
*G01T 1/208* (2006.01)

(52) U.S. Cl.
CPC ................. *G01T 1/248* (2013.01); *G01T 1/208* (2013.01); *G01T 1/2018* (2013.01)

(58) Field of Classification Search
CPC ......... G01J 1/02; G01T 1/2018; G01T 1/208; G01T 1/248
See application file for complete search history.

(56) References Cited

U.S. PATENT DOCUMENTS

| 5,144,141 | A | 9/1992 | Rougeot et al. | |
|---|---|---|---|---|
| 8,395,127 | B1* | 3/2013 | Frach | G01T 1/2018 250/370.08 |
| 2010/0314531 | A1* | 12/2010 | Menge | G01T 7/005 250/214.1 |
| 2012/0326010 | A1* | 12/2012 | Mabuchi | H04N 5/37457 250/208.1 |
| 2013/0009266 | A1 | 1/2013 | Sato et al. | |
| 2013/0320217 | A1* | 12/2013 | Kawaguchi | G01T 3/06 250/361 R |

FOREIGN PATENT DOCUMENTS

| JP | 7-311270 | 11/1996 |
|---|---|---|
| JP | 2011-258645 | 12/2011 |
| JP | 2013-16638 | 1/2013 |

* cited by examiner

*Primary Examiner* — Marcus Taningco
(74) *Attorney, Agent, or Firm* — Finnegan, Henderson, Farabow, Garrett & Dunner LLP

(57) ABSTRACT

According to an embodiment, a photodetector includes a photodetecting element that has a pn junction and outputs a photocurrent corresponding to detected light, a voltage applying unit that applies a voltage to the photodetecting element, an obtaining unit that obtains the photocurrent detected by the photodetecting element, and a voltage controller. The voltage controller controls the voltage applying unit to apply, during a drive period, a drive voltage whose absolute value is not smaller than an avalanche breakdown voltage of the pn junction and which is in reverse bias with respect to the pn junction; and apply, during a standby period, any of a first standby voltage in forward bias, a second standby voltage with a voltage value of 0 V, and a third standby voltage whose absolute value is greater than 0 V, which is less than the drive voltage, and which is in reverse bias.

6 Claims, 8 Drawing Sheets

PHOTODETECTOR

CROSS-REFERENCE TO RELATED APPLICATIONS

This application is based upon and claims the benefit of priority from Japanese Patent Application No. 2014-054399, filed on Mar. 18, 2014; the entire contents of which are incorporated herein by reference.

FIELD

An embodiment described herein relates generally to a photodetector.

BACKGROUND

There is known a photodetector in which a plurality of avalanche photodiodes (APDs) are arranged as photodetecting elements in a single pixel. As a representative photodetector, a silicon photomultiplier (SiPM) using silicon diodes as APDs is known.

For the silicon diodes, generally, p-n diodes are used. In the SiPM, a plurality of units, each including an APD and a quenching resistor, are connected in parallel in a single pixel. When a reverse-bias voltage is applied to an APD, a depletion layer is formed in the APD. Within the depletion layer, an electric field is formed by ionized donors and acceptors. When electron-hole pairs are formed within the depletion layer by the electric field, the electrons and holes move in opposite directions. When the electric field is strong, the moving speeds of the electrons and holes increase.

When the electrons and holes move within the depletion layer, they repeat collisions with atoms constituting the semiconductor. When the speeds of the electrons and holes exceed values determined for the electrons and holes, respectively, other electron-hole pairs are newly formed upon the collision with atoms constituting the semiconductor.

The new electron-hole pairs are also accelerated by the electric field and collide with other semiconductor constituent atoms, further forming other electron-hole pairs. By a chain reaction where such a phenomenon is repeated, a large avalanche breakdown current flows, triggered by the formation of one electron-hole pair. The function of the quenching resistor is to stop the avalanche breakdown current after a certain current flows. Specifically, by the avalanche breakdown current flowing through the quenching resistor, a voltage drop occurs at both ends of the quenching resistor. As a result, the voltage applied to the pn junction of the APD decreases and then the strength of the electric field within the depletion layer decreases, stopping the avalanche breakdown. The gain of the APD at this time is as very high as $10^5$ to $10^6$, and thus, even weak light of a single photon can be measured.

In addition, there is disclosed a device in which a plurality of combinations, each having a plurality of APDs and a scintillator that converts X-rays into scintillation light, are arranged. By thus combining APDs and a scintillator, an image having a spatial resolution according to the size of the scintillator can be obtained using photo-counting technique. For example, there is also known a technique for obtaining a CT (Computed Tomography) image by detecting X-rays.

As such, the SiPM can obtain high sensitivity by using the avalanche breakdown. However, the sensitivity of the SiPM greatly changes due to minute fluctuations in the voltage that is applied during a drive period in which photocurrents are obtained. Further, the sensitivity of the SiPM is sensitive to changes in temperature. In addition, when a voltage is applied to the photodetecting elements, Joule heat is generated. In view of this, JP-A 2013-16638 (KOKAI) discloses a technique for adjusting the voltage value of a voltage applied during the drive period, according to the temperature of an SiPM. In addition, JP-A 2011-258645 (KOKAI) discloses a technique for adjusting a voltage value applied during the standby period in order to suppress the influence of a dark current measured during the drive period.

Here, the present inventors have found that, when a drive voltage that is applied during a drive period in which photocurrents are obtained is continuously applied to a photodetecting element, the avalanche breakdown voltage of the photodetecting element changes. If the avalanche breakdown voltage is changed, then an appropriate drive voltage value at which the maximum sensitivity can be obtained in the photodetecting element changes. Namely, the conventional art has a problem that by continuously applying, as a drive voltage, a reverse-bias voltage higher than the avalanche breakdown voltage of the photodetecting element, the sensitivity of the photodetecting element decreases.

DETAILED DESCRIPTION

According to an embodiment, a photodetector includes a photodetecting element, a voltage applying unit, a first obtaining unit, and a voltage controller. The photodetecting element has a pn junction and outputs a photocurrent corresponding to detected light. The voltage applying unit applies a voltage to the photodetecting element. The first obtaining unit obtains the photocurrent detected by the photodetecting element. The voltage controller controls the voltage applying unit to apply, during a drive period in which the photocurrent is obtained, a drive voltage and apply, during a standby period in which the photocurrent is not obtained, any of a first standby voltage, a second standby voltage with a voltage value of 0 V, and a third standby voltage. The drive voltage has a voltage value whose absolute value is equal to or greater than an avalanche breakdown voltage of the pn junction and is in reverse bias with respect to the pn junction. The first standby voltage is in forward bias with respect to the pn junction. The third standby voltage has a voltage value whose absolute value is greater than 0 V and which is less than the drive voltage and is in reverse bias with respect to the pn junction.

An embodiment will be described in detail below with reference to the accompanying drawings.

Figure 1:
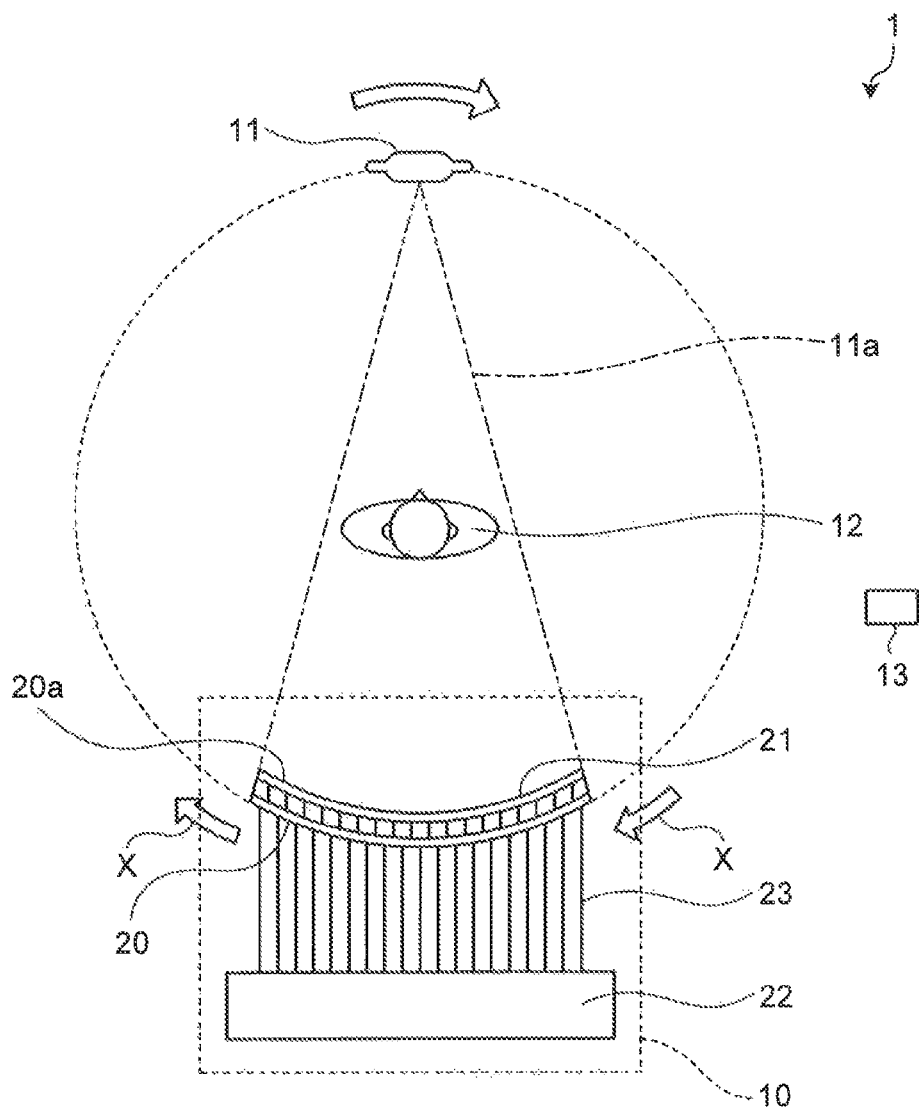
FIG. 1 is a schematic diagram illustrating an example of an inspection apparatus.

FIG. 1 is a schematic diagram illustrating an example of an inspection apparatus 1 of the embodiment.

The inspection apparatus 1 includes a light source 11, a photodetector 10, and a driving unit 13. The light source 11 and the driving unit 13 are electrically connected to the photodetector 10.

The light source 11 and the photodetector 10 are disposed facing each other with spacing therebetween. A subject 12 to be inspected can be disposed between the photodetector 10 and the light source 11. In addition, the light source 11 and the photodetector 10 are provided so as to be rotatable about the subject 12 with their facing disposition state maintained.

The light source 11 emits radiation 11a such as X-rays toward the photodetector 10 facing the light source 11. The radiation 11a emitted from the light source 11 passes through the subject 12 on a table which is not illustrated, and enters the photodetector 10.

The photodetector 10 is a device that detects light. The photodetector 10 includes a plurality of detection units 20 and a signal processing circuit 22. The detection units 20 and the signal processing circuit 22 are electrically connected to each other. In the embodiment, the plurality of detection units 20 provided in the photodetector 10 are arranged along a rotational direction (an arrow X direction in FIG. 1) of the photodetector 10.

The detection units 20 receive the radiation 11a emitted from the light source 11 and passing through the subject 12, with an incident surface 20a thereof through a collimator 21. The collimator 21 is placed on the incident surface 20a side of the detection units 20 and prevents scattered light from entering the detection units 20.

The detection units 20 detect the received light. Then, the detection units 20 output photocurrents according to the detected light to the signal processing circuit 22 through signal lines 23. The signal processing circuit 22 controls the entire inspection apparatus 1. The signal processing circuit 22 obtains the photocurrents from the detection units 20.

In the embodiment, the signal processing circuit 22 calculates the energies and intensities of the radiation entering each detection unit 20, based on the current values of the obtained photocurrents. Then, the signal processing circuit 22 produces an image based on radiation information of the subject 12 based on the energies and intensities of the radiation entering each detection unit 20.

The driving unit 13 allows the light source 11 and the photodetector 10 to rotate about the subject 12 located between the light source 11 and the photodetector 10, with their facing state maintained. By this, the inspection apparatus 1 can produce tomographic images of the subject 12.

Note that the subject 12 is not limited to the human body. The subject 12 may be animals, plants, or non-living objects such as articles. Namely, the inspection apparatus 1 can be applied not only as inspection apparatuses for producing tomographic images of the human body, animals and plants, but also as various types of inspection apparatuses such as security apparatuses for seeing through articles.

Figure 2A:
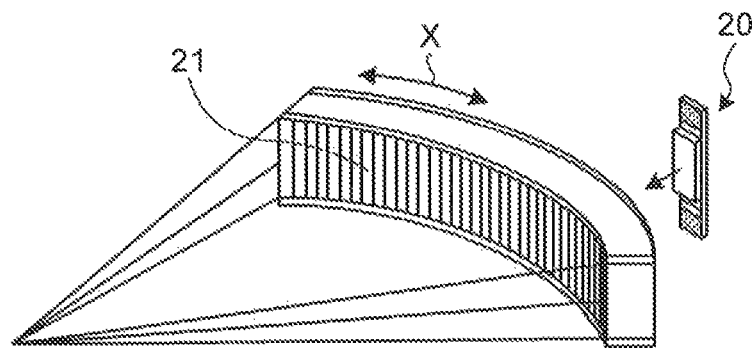
FIGS. 2A and 2B are explanatory diagrams of detection units.
Figure 2B:
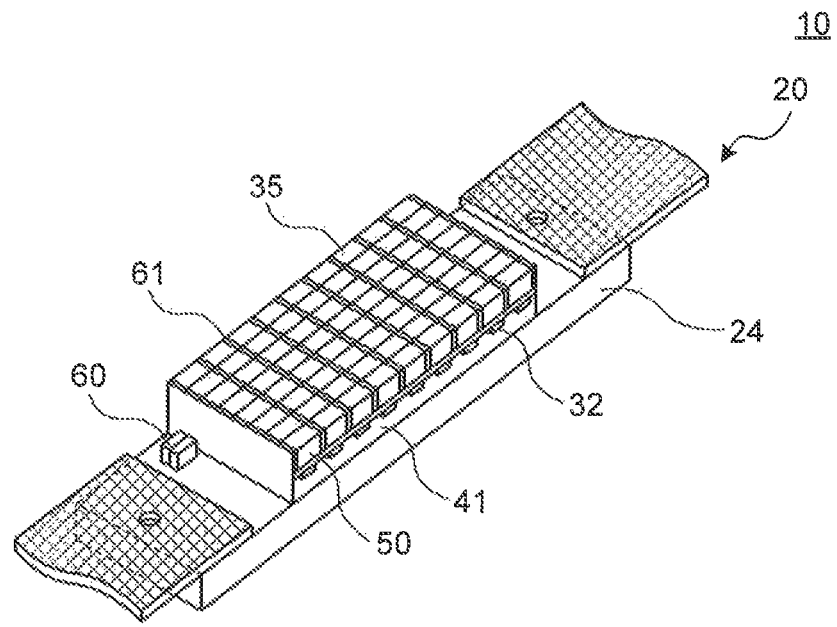

FIGS. 2A and 2B are explanatory diagrams of the detection units 20. FIG. 2A is a diagram illustrating the arrangement state of the plurality of detection units 20. The plurality of detection units 20 are arranged in a substantially arc shape in the rotational direction of the detection units 20 (see an arrow X in FIG. 2A).

FIG. 2B is a schematic diagram of the detection unit 20. The detection unit 20 has a photoelectric conversion layer 41 and a scintillator 50 on a support substrate 24.

The scintillator 50 converts radiation into light (photons) having a longer wavelength than the radiation. The scintillator 50 is composed of a scintillator material. The scintillator material emits fluorescence (scintillation light) by the incidence of radiation such as X-rays. Note that in the embodiment a description is made such that fluorescence (scintillation light) emitted by the scintillator 50 is referred to as light. The scintillator material is selected as appropriate, according to the application target of the photodetector 10. The scintillator material is, for example, $Lu_2SiC_5$:(Ce), $LaBr_3$:(Ce), YAP (Yttrium Aluminum Perovskite):Ce, or Lu(Y)AP:Ce, but is not limited thereto.

The photoelectric conversion layer 41 detects the light obtained by the conversion by the scintillator 50. The photoelectric conversion layer 41 is a silicon photomultiplier (SiPM) in which a plurality of avalanche photodiodes (APDs) are arranged as photodetecting elements 32. The APD is a known avalanche photodiode.

Namely, in the embodiment, the photodetector 10 includes the scintillator 50 on the light incident side of the photodetecting elements 32. Note that the photodetector 10 may not include the scintillator 50.

The photoelectric conversion layer 41 is configured such that a plurality of photodetecting elements 32 serve as one pixel (pixel region 35), and a plurality of pixel regions 35 are arranged in a matrix form. In the embodiment, the scintillator 50 is separated by reflective layers 61 into a plurality of regions corresponding to the respective pixel regions 35. By light entering each pixel region 35 of the photoelectric conversion layer 41 provided on the light exit side of the scintillator 50, the energy and intensity of the entered light are detected for each pixel region 35.

In addition, in the embodiment, the detection unit 20 is provided with a temperature detector 60. The temperature detector 60 detects the temperature of the photodetecting elements 32. The temperature detector 60 may be provided at any location where the temperature of the photodetecting elements 32 can be detected, and thus, the placement location of the temperature detector 60 is not limited to that illustrated in FIGS. 2A and 2B.

Figure 3:
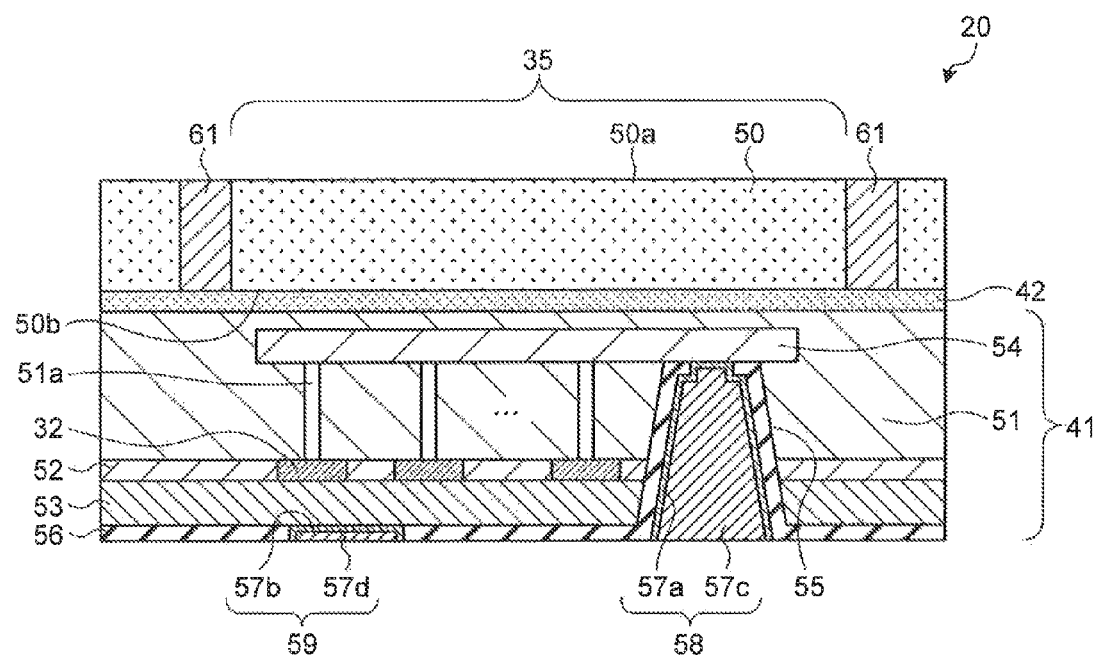
FIG. 3 is a cross-sectional view of a detection unit.

FIG. 3 illustrates an example of a cross-sectional view of a detection unit 20. Note that the detection unit 20 may have any configuration as long as the configuration includes known APDs as the photodetecting elements 32, and thus, the structure thereof is not limited to the example illustrated in FIG. 3.

The detection unit 20 has a multilayer structure in which the scintillator 50 and the photoelectric conversion layer 41 are bonded together with a bonding layer 42.

The scintillator 50 converts radiation entering through an incident surface 50a into light. The light exits from an exit surface 50b toward the photoelectric conversion layer 41. The bonding layer 42 has the function of bonding the scintillator 50 and the photoelectric conversion layer 41 together. The bonding layer 42 allows the light exiting from the scintillator 50 to pass therethrough. The thickness of the bonding layer 42 is, for example, several tens to several hundreds of μm.

The scintillator 50 is provided with the reflective layers 61. The scintillator 50 is separated by the reflective layers 61 into a plurality of regions corresponding to the respective pixel regions 35. The reflective layers 61 reflect light. The reflective layers 61 are formed of, for example, a material in which micropowder such as $TiO_2$, $BaSO_4$, or Ag is mixed in a binder resin.

The photoelectric conversion layer 41 converts the light exiting from the exit surface 50b of the scintillator 50 into an electrical signal. The photoelectric conversion layer 41 has a multilayer structure having a silicon oxide layer 51, a first silicon layer 52, a second silicon layer 53, and an insulating film 56 stacked on each other from the bonding layer 42 side.

The silicon oxide layer 51 is formed of a material containing silicon dioxide ($SiO_2$), and holds a common wiring line 54 therewithin. For example, the silicon oxide layer 51 contains silicon dioxide as the largest composition. The common wiring line 54 is a mesh-like metal (e.g., aluminum or copper) wiring line that extends in a planar manner along the exit surface 50b of the scintillator 50 and is disposed so as to be within the silicon oxide layer 51 in each pixel region 35.

The first silicon layer 52 is formed of P-type silicon. The first silicon layer 52 is formed, for example, by epitaxial growth on the second silicon layer 53 formed of an N-type silicon which will be described later. The first silicon layer 52 has a plurality of photodetecting elements 32 formed in each pixel region 35.

The photodetecting elements 32 are avalanche photodiodes (APDs) which are formed as PN-type diodes by doping each portion of the first silicon layer 52 with a doping material such as boron. The photodetecting elements 32 provide continuity in a reverse-bias direction between the silicon oxide layer 51 side (anode) and second silicon layer 53 side (cathode) of the photodetecting elements 32 by avalanche breakdown which occurs by light (photons) entering the photodetecting elements 32.

The photodetecting elements 32 within the pixel region 35 are connected to the same common wiring line 54 with conductors (e.g., aluminum or tungsten) inserted into contact holes 51a which are formed from the anode side of the photodetecting elements 32 toward the common wiring line 54. The photodetecting elements 32 are formed in the first silicon layer 52 with 25 μm pitches, for example. In addition, each photodetecting element 32 has a series resistor (not illustrated) which is a quenching resistor, between the first silicon layer 52 and the common wiring line 54. The series resistor can be formed of, for example, a polysilicon layer.

Note that the common wiring line 54 is not limited to a mesh-like metal wiring line. The common wiring line 54 may have any form as long as, for example, the common wiring line 54 has such a level of light transmittance that allows light exiting from the exit surface 50b to be sufficiently detected by the photodetecting elements 32, and the photodetecting elements 32 present within the same pixel region 35 have continuity therebetween through the conductors in the contact holes 51a.

The second silicon layer 53 is formed of N-type silicon. The second silicon layer 53 provides continuity between each photodetecting element 32 within the pixel region 35 and a common electrode 59.

The insulating film 56 covers a surface of the second silicon layer 53 on the opposite side of the first silicon layer 52. The insulating film 56 is formed of, for example, silicon dioxide ($SiO_2$).

In addition, a recess portion 55 is formed in the photoelectric conversion layer 41. The recess portion 55 is formed in a direction in which the silicon oxide layer 51, the first silicon layer 52, the second silicon layer 53, and the insulating film 56 are stacked on each other, from the insulating film 56 side to a location where the recess portion 55 reaches the common wiring line 54 in the silicon oxide layer 51 so as to pass through the second silicon layer 53 and the first silicon layer 52. The inner side of the recess portion 55 is covered with the insulating film 56, and the inner side of the insulating film 56 is further filled with a through-electrode 58.

The through-electrode 58 has a seed layer 57a that covers the insulating film 56 on the inner side of the recess portion 55; and a filling member 57c that fills the inner side of the seed layer 57a. The seed layer 57a is, for example, a layer of materials such as titanium and copper which is formed by a sputtering process. A portion of the seed layer 57a located on the common wiring line 54 side comes into contact with the common wiring line 54 to provide electrical continuity between the through-electrode 58 and the common wiring line 54. The filling member 57c is formed on the inner side of the seed layer 57a. The filling member 57c can be formed of a material such as copper formed by an electrolytic copper plating process.

The through-electrode 58 is provided from a surface of the photoelectric conversion layer 41 on the opposite side of a surface of the photoelectric conversion layer 41 facing the bonding layer 42, to the common wiring line 54. The insulating film 56 covers an interior wall of the recess portion 55 and allows at least a part of the common wiring line 54 on the first silicon layer 52 side to be exposed. The seed layer 57a covers an interior wall of the insulating film 56 and the exposed portion of the common wiring line 54 exposed from the insulating film 56. The through-electrode 58 is provided on the inner side of the recess portion 55 covered with the insulating film 56. The through-electrode 58 connects the portion of the seed layer 57a covering the common wiring line 54 to the surface of the photoelectric conversion layer 41 on the opposite side of the surface of the photoelectric conversion layer 41 facing the bonding layer 42.

The recess portion 55 has, for example, a tapered shape where its cross section decreases toward the common wiring line 54 side from the insulating film 56 side. Note that the through-electrode 58 is an electrode made of copper and is formed by an electrolytic copper plating process, but is not limited thereto and may be formed of other metals by other electrode formation methods. In addition, although in FIG. 3 in the through-electrode 58 the inner side of the insulating film 56 of the recess portion 55 is completely filled, the through-electrode 58 is not limited thereto and may be formed conformally in a non-filled state. In this case, it is preferred that all of the through-electrode 58, except its partial exposed portion, be covered with an insulating resin.

In addition, a part of the insulating film 56 included in the same pixel region 35 where the through-electrode 58 is formed is removed, and the removed portion is covered with the common electrode 59. The common electrode 59 includes a seed layer 57b that covers the removed portion; and a filling portion 57d that fills the inner side of the seed layer 57b. The seed layer 57b is formed by, for example, a sputtering process. Then, the filling portion 57d is formed on the inner side of the seed layer 57b formed in a recessed shape. The filling portion 57d can be formed of a material such as copper by an electrolytic copper plating process.

When the light source 11 (see FIG. 1) irradiates the detection unit 20 having the above-described configuration with the radiation 11a (see FIG. 1), the radiation 11a enters the incident surface 50a of the scintillator 50. The radiation 11a is converted by the scintillator 50 into light, and the light exits from the exit surface 50b.

The light exiting from the exit surface 50b passes through the bonding layer 42 and the silicon oxide layer 51 and enters each of the plurality of photodetecting elements 32.

A drive voltage of reverse bias with respect to the pn junctions of the photodetecting elements 32 is applied between the through-electrode 58 and the common electrode 59 under control of the signal processing circuit 22 (see FIG. 1). By light entering the photodetecting elements 32 in this state, a pulse current flows through the photodetecting elements 32 in a reverse-bias direction, and a current flows between the through-electrode 58 and the common electrode 59. Then, the current flowing between the through-electrode 58 and the common electrode 59 is outputted as a photocurrent to the signal processing circuit 22 through a signal line 23.

In this manner, the detection unit 20 detects photocurrents.

Figure 4:
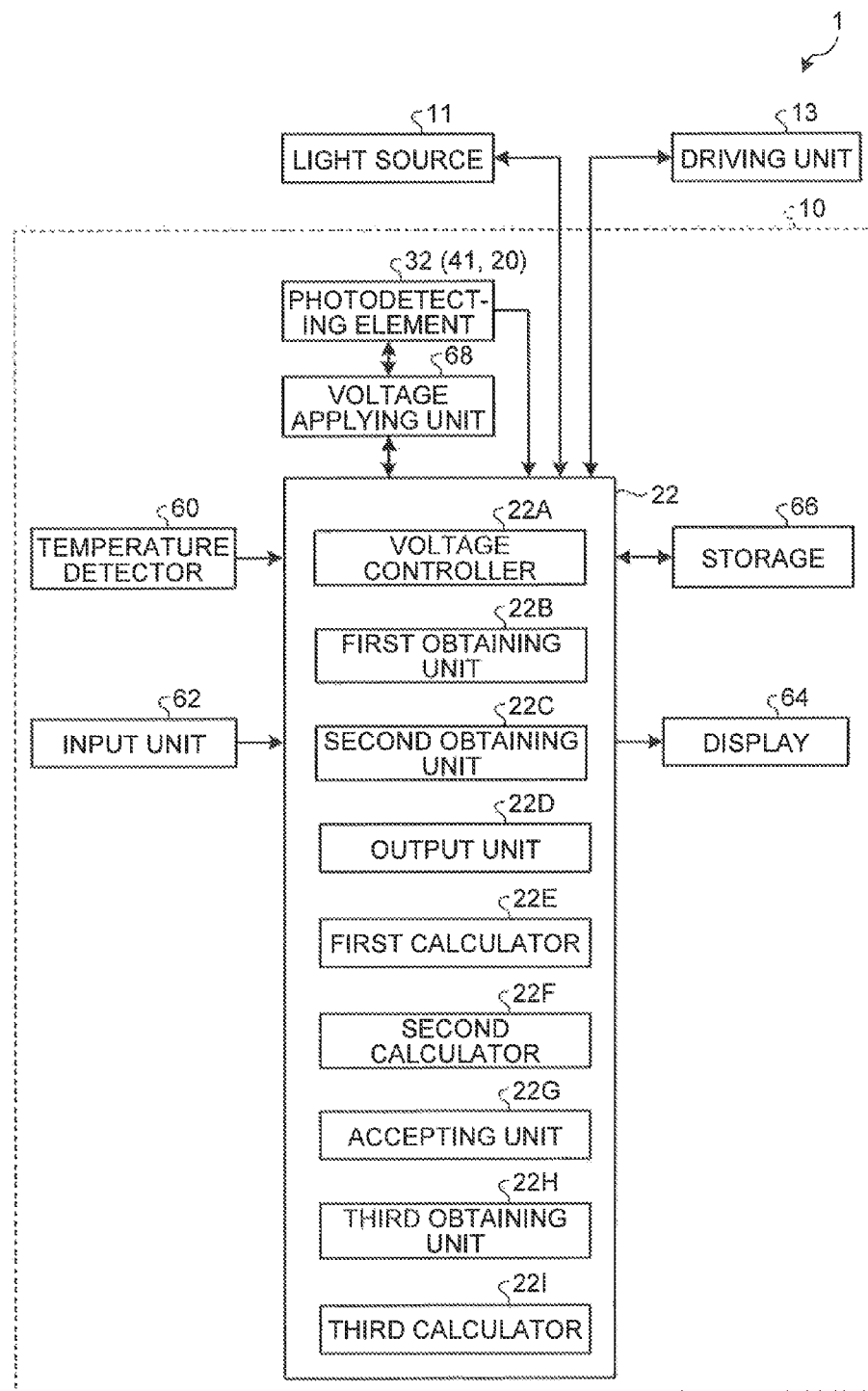
FIG. 4 is a block diagram illustrating a functional configuration of the inspection apparatus.

FIG. 4 is a block diagram illustrating a functional configuration of the inspection apparatus 1.

As illustrated in FIG. 4, the inspection apparatus 1 includes the light source 11, the driving unit 13, and the photodetector 10. The photodetector 10 includes the photodetecting elements 32 which are APDs, a voltage applying unit 68, the temperature detectors 60, an input unit 62, a storage 66, a display 64, and the signal processing circuit 22.

The light source 11, the driving unit 13, the photodetecting elements 32, and the temperature detectors 60 are described above and thus a description thereof is omitted here.

The voltage applying unit 68 applies a voltage to the pn junctions of the photodetecting elements 32. The photodetecting elements 32 are, as described above, APDs. The voltage applying unit 68 applies a voltage to the photodetecting elements 32. Specifically, for example, the voltage applying unit 68 applies a voltage between the through-electrode 58 and the common electrode 53 illustrated in FIG. 3, and thereby applies a voltage to each photodetecting element 32.

The input unit 62 accepts various types of instructions from a user. The input unit 62 is, for example, known switches or touch panel. In the embodiment, the input unit 62 accepts from the user a drive instruction to obtain photocurrents outputted from the photodetecting elements 32, an end instruction to end the detection by the photodetecting elements 32, etc. The drive instruction to obtain photocurrents may be a shooting instruction to produce a tomographic image by obtaining photocurrents.

The storage 66 stores therein various types of data. The display 64 displays various types of images. In the embodiment, the display 64 displays, for example, a tomographic image of the subject 12, as the results of photodetection.

The signal processing circuit 22 controls the entire photodetector 10. Although the embodiment describes the case in which the signal processing circuit 22 is composed of a circuit, the signal processing circuit 22 may be composed of a computer which is configured to include a CPU (Central Processing Unit), etc.

The signal processing circuit 22 includes a voltage controller 22A, a first obtaining unit 22B, a second obtaining unit 22C, an output unit 22D, a first calculator 22E, a second calculator 22F, an accepting unit 22G, a third obtaining unit 22H, and a third calculator 22I. Some or all of the voltage controller 22A, the first obtaining unit 22B, the second obtaining unit 22C, the output unit 22D, the first calculator 22E, the second calculator 22F, and the accepting unit 22G may be implemented, for example, by allowing a processing apparatus such as a CPU to execute a program, i.e., by software, or may be implemented by hardware such as an integrated circuit (IC), or may be implemented by using both software and hardware.

The first obtaining unit 22B obtains photocurrents detected by the photodetecting elements 32.

The voltage controller 22A applies, during a drive period, a drive voltage Vop that has a voltage value whose absolute value exceeds an avalanche breakdown voltage Vbd of the pn junctions of the photodetecting elements 32 and that is in reverse bias with respect to the pn junctions.

In the embodiment, the drive period indicates a period in which the first obtaining unit 22B obtains photocurrents from the photodetecting elements 32. Namely, the drive period indicates a period in which the first obtaining unit 22B obtains photocurrents within a period in which photocurrents are outputted to the signal processing circuit 22 from the photodetecting elements 32.

A reverse bias with respect to the pn junctions indicates that a voltage is applied to the photodetecting elements 32 with the anode side (p-type region side) being negative and the cathode side (n-type region side) being positive.

For the drive voltage Vop, though it depends on the configuration of the photodetecting elements 32, for example, a reverse-bias voltage obtained by adding a voltage value of 2 V to 3 V to the absolute value of the avalanche breakdown voltage Vbd is used. Note that the added value may be adjusted as appropriate according to the configuration of the photodetecting elements 32 and thus is not limited to 2 V to 3 V.

By the voltage applying unit 68 applying the above-described drive voltage Vop to the pn junctions of the photodetecting elements 32, the photodetecting elements 32 operate and output photocurrents according to incident light (photons) to the signal processing circuit 22.

Here, the present inventors have found that, when the drive voltage Vop which is a revere-bias voltage higher than the avalanche breakdown voltage Vbd of the photodetecting elements 32 is continuously applied to the photodetecting elements 32, the avalanche breakdown voltage Vbd of the photodetecting elements 32 changes according to the application time.

Figure 5:
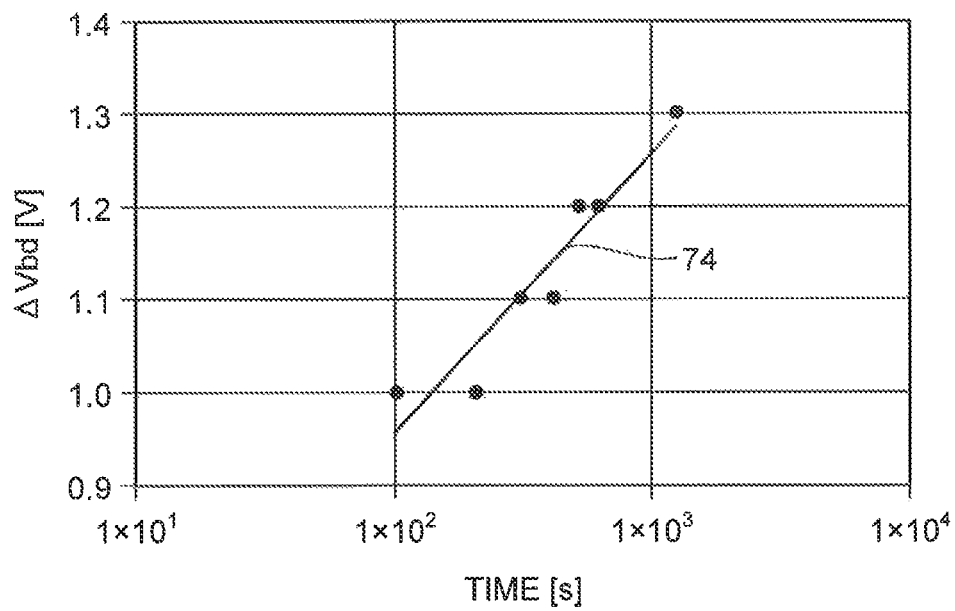
FIG. 5 is a chart illustrating a relationship between application time and the amount of change in avalanche breakdown voltage.

FIG. 5 is a chart 74 illustrating a relationship between application time and the amount of change in avalanche breakdown voltage Vbd ($\Delta$Vbd) for when the drive voltage Vop is applied to the photodetecting elements 32. As illustrated in FIG. 5, the present inventors have found that the amount of change in the avalanche breakdown voltage Vbd ($\Delta$Vbd) of the photodetecting elements 32 increases according to the application time of the drive voltage Vop.

In the example illustrated in FIG. 5, the leakage current is about $2.0 \times 10^{-7}$ A, though it varies depending on the configurations of the photodetecting elements 3 and the photoelectric conversion layer 41. In addition, the power in a reverse direction with respect to the pn junctions is determined by (the applied drive voltage Vop)×(the leakage current).

Referring back to FIG. 4, hence, in the embodiment, the voltage controller 22A controls the voltage applying unit 68 to apply, during a standby period, any of a first standby voltage, a second standby voltage, and a third standby voltage as a standby voltage Vs.

In the embodiment, the standby period indicates a period in which the first obtaining unit 22B does not obtain photocurrents. Namely, the standby period is part or the entire period except the drive period. Specifically, the standby period indicates a period in which photocurrents are not outputted to the signal processing circuit 22 from the photodetecting elements 32, and a period in which the first obtaining unit 22B does not obtain photocurrents within a period in which photocurrents are outputted to the signal processing circuit 22 from the photodetecting elements 32.

The first standby voltage is a voltage in forward bias with respect to the pn junctions of the photodetecting elements 32. The first standby voltage may be any as long as it is a forward-bias voltage and thus its voltage value is not limited.

The second standby voltage is a voltage of 0 V. Namely, the second standby voltage indicates that no voltage is applied to the photodetecting elements 32.

The third standby voltage is a voltage that has a voltage value whose absolute value is greater than 0 V and that is less than the drive voltage Vop, and that is in reverse bias with respect to the pn junctions of the photodetecting elements 32.

The forward bias with respect to the pn junctions indicates that a voltage is applied to the pn junctions of the photodetecting elements 32 with the anode side (p-type region side) being positive and the cathode side (n-type region side) being negative.

The voltage controller 22A controls the voltage applying unit 68 to apply, during the standby period, any of the first standby voltage, the second standby voltage, and the third standby voltage as the standby voltage Vs.

As described above, when the drive voltage Vop is continuously applied to the pn junctions of the photodetecting elements 32, the avalanche breakdown voltage Vbd of the photodetecting elements 32 changes. Hence, if the drive voltage Vop is continuously applied during the standby period, then the change in the avalanche breakdown voltage Vbd of the photodetecting elements 32 increases and accordingly a reduction in the sensitivity of the photodetecting elements 32 progresses.

On the other hand, when the voltage controller 22A controls the voltage applying unit 68 to apply the second standby voltage which is a voltage of 0 V, during the standby period the photodetecting elements 32 go into a state where no voltage is applied thereto. Hence, by the voltage controller 22A controlling the voltage applying unit 68 to apply the second standby voltage, fluctuations in avalanche breakdown voltage Vbd caused by the continuous application of the drive voltage Vop can be suppressed. Hence, a reduction in the sensitivity of the photodetecting elements 32 can be suppressed.

In addition, the sensitivity of the photodetecting elements 32 is sensitive to changes in temperature. Hence, in terms of keeping the temperature of the photodetecting elements 32 during the drive period constant, it is preferred that a voltage be continuously applied to the photodetecting elements 32 even during the standby period in which the signal processing circuit 22 does not obtain photocurrents. However, as described above, the present inventors have found that, when the drive voltage Vop is continuously applied, the fluctuation in avalanche breakdown voltage Vbd increases according to the application time.

In view of this, the voltage controller 22A controls the voltage applying unit 68 to apply the third standby voltage which is a voltage that has a voltage value whose absolute value is greater than 0 V and that is less than the drive voltage Vop, and that is in reverse bias with respect to the pn junctions. By doing so, by the application of the third standby voltage in reverse bias, the photodetecting elements 32 generate Joule heat. In addition, since the third standby voltage is a reverse-bias voltage whose absolute value is less than the drive voltage Vop, fluctuations in the avalanche breakdown voltage Vbd of the photodetecting elements 32 can be suppressed compared to the case in which the drive voltage Vop is continuously applied to the photodetecting elements 32 during the standby period.

Hence, by the voltage controller 22A controlling the voltage applying unit 68 to apply the third standby voltage, fluctuations in the avalanche breakdown voltage Vbd of the photodetecting elements 32 can be suppressed while fluctuations in the temperature of the photodetecting elements 32 are suppressed.

Figure 6:
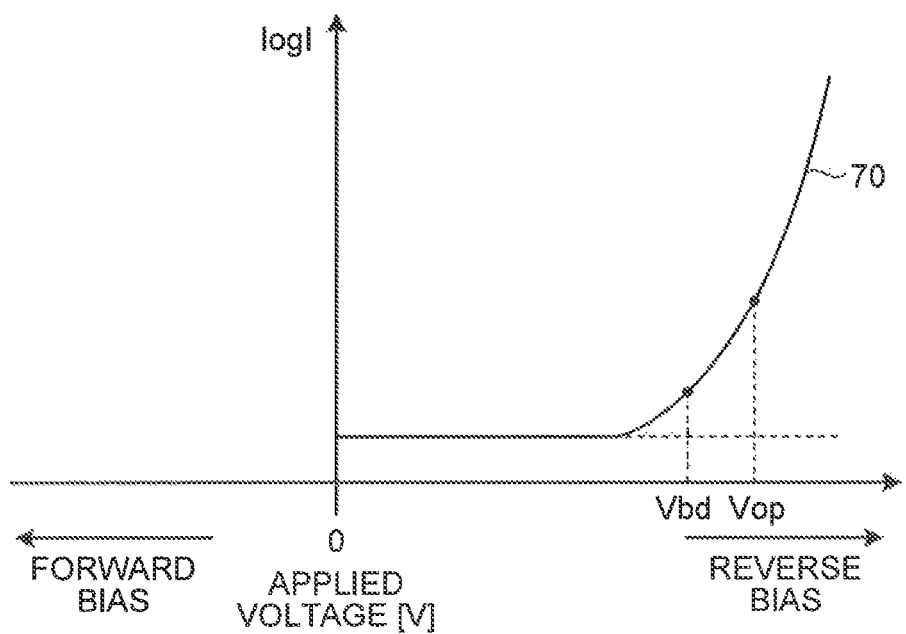
FIG. 6 is a chart illustrating a relationship between applied voltage and the logarithm of a photocurrent.

FIG. 6 is a chart 70 illustrating a relationship between the applied voltage applied to a photodetecting element 32 and the logarithm (logI) of a photocurrent outputted from the photodetecting element 32. As illustrated in FIG. 6, when a reverse-bias voltage is applied to the photodetecting element 32, thereby changing the voltage value, the photocurrent suddenly increases near the avalanche breakdown voltage Vbd.

The voltage value of the third standby voltage is any as long as its absolute value is greater than 0 V and the voltage value is less than the drive voltage Vop, and may be adjusted as appropriate according to the configuration of the photodetecting elements 32, etc.

Note that, when a forward-bias voltage is applied to the photodetecting element 32, the photodetecting element 32 generates larger Joule heat compared to the case in which a reverse-bias voltage with the same voltage value is applied to the photodetecting element 32.

Figure 7:
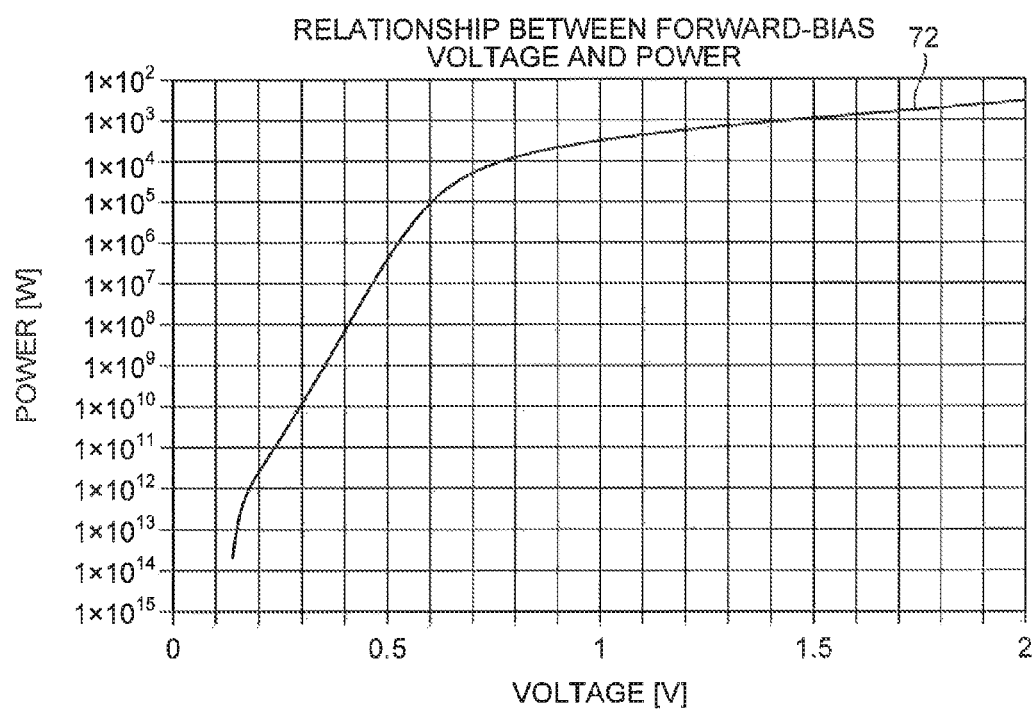
FIG. 7 is a chart illustrating a relationship between forward-bias voltage and power which is the product of a current in the forward direction and a bias voltage in the forward direction.

FIG. 7 is a chart 72 illustrating a relationship between the forward-bias voltage applied to a photodetecting element 32 and the power (W) which is the product of a current in the forward direction outputted from the photodetecting element 32 and a forward-bias voltage. As illustrated in FIG. 7, when forward bias is applied to the photodetecting element 32, large power is outputted by applying a lower voltage.

Hence, when the voltage controller 22A applies the first standby voltage in forward bias with respect to the pn junctions of the photodetecting elements 32 during the standby period, by the application of a lower voltage, fluctuations in the avalanche breakdown voltage Vbd of the photodetecting elements 32 can be suppressed while fluctuations in the temperature of the photodetecting elements 32 are suppressed, compared to the case of applying the third standby voltage in reverse bias.

Note that it is preferred that the voltage value of a standby voltage applied to the photodetecting elements 32 by the voltage applying unit 68 during the standby period and the voltage application time be voltage application conditions for generating Joule heat according to the temperature of the photodetecting elements 32 obtained during the drive period. By the voltage controller 22A controlling the voltage applying unit 68 to apply the first standby voltage or the third standby voltage under the voltage application conditions (voltage value and voltage application time) for generating Joule heat according to the temperature of the photodetecting elements 32 obtained during the drive period, the fluctuations in the temperature of the photodetecting elements 32 can be suppressed. Hence, the fluctuations in the sensitivity of the photodetecting elements 32 can be suppressed.

Referring back to FIG. 4, hence, the second obtaining unit 22C of the signal processing circuit 22 according to the embodiment obtains the temperature of the photodetecting elements 32 during the drive period. The temperature of the photodetecting elements 32 during the drive period specifically indicates a temperature of the photodetecting elements 32 during the drive period obtained in a state where the temperature becomes substantially constant by the application of a drive voltage to the photodetecting elements 32. More specifically, it is preferred that the temperature of the photodetecting elements 32 during the drive period be a temperature of the photodetecting elements 32 during the drive period obtained immediately before transitioning to the standby period from the drive period. The second obtaining unit 22C obtains a temperature detection result for the drive period from the temperature detector 60 and thereby obtains the temperature of the photodetecting elements 32 during the drive period.

The second obtaining unit 22C may obtain the temperature of the photodetecting elements 32 during the drive period from the second calculator 22F. The second calculator 22F calculates Joule heat generated in the photodetecting elements 32 during a drive period, from the time elapsed from the last transition from a standby period to the drive period and the drive voltage Vop applied during the drive period. The resistance value of the photodetecting elements 32 used for calculation of Joule heat may be prestored in the storage 66. Then, upon calculating the Joule heat of the photodetecting elements 32, the second calculator 22F calculates the Joule heat based on the resistance value of the photodetecting elements 32 read from the storage 66, the above-described time elapsed, and based on the voltage value of the drive voltage Vop.

Likewise, the second obtaining unit 22C may obtain the temperature of the photodetecting elements 32 during the standby period from the second calculator 22F. The second calculator 22F calculates Joule heat generated in the photodetecting elements 32 during a standby period, based on the time elapsed from the last transition from a drive period to the standby period and based on a standby voltage applied during the standby period. Upon calculating the Joule heat of the photodetecting elements 32, the second calculator 22F calculates the Joule heat from the resistance value of the photodetecting elements 32 read from the storage 66, the above-described time elapsed, and the voltage value of the standby voltage.

In this case, the second obtaining unit 22C obtains the temperature of the photodetecting elements 32 during the drive period by calculating the temperature of the photodetecting elements 32 from the Joule heat calculated by the second calculator 22F.

The first calculator 22E calculates voltage application conditions for allowing the photodetecting elements 32 to generate Joule heat according to the temperature of the photodetecting elements 32 during the drive period which is obtained by the second obtaining unit 22C. The voltage application conditions include a voltage value and voltage application time. Note that, for the voltage application time, the shortest time that can be set as a standby period, standby period average time, etc., may be predetermined. In this case, the first calculator 22E calculates a voltage value as a voltage application condition.

Specifically, when the above-described third standby voltage which is in reverse bias is applied during the standby period, the first calculator 22E calculates a reverse-bias voltage value whose absolute value is greater than 0 V and which is less than the drive voltage Vop. On the other hand, when the above-described first standby voltage which is in forward bias is applied during the standby period, the first calculator 22E calculates a forward-bias voltage value.

Note that the first calculator 22E may calculate, using Joule heat calculated by the second calculator 22F, voltage application conditions for allowing the photodetecting elements 32 to generate the Joule heat, without through the second obtaining unit 22C.

Then, the voltage controller 22A controls the voltage applying unit 68 to apply any of the first standby voltage, the second standby voltage, and the third standby voltage according to the voltage application condition calculated by the first calculator 22E.

Specifically, when the first calculator 22E calculates, as a voltage application condition, a reverse-bias voltage value less than the drive voltage Vop, the voltage controller 22A controls the voltage applying unit 68 to apply the third standby voltage in reverse bias with the calculated voltage value for a predetermined period of time.

In addition, when the first calculator 22E calculates, as a voltage application condition, a forward-bias voltage value, the voltage controller 22A controls the voltage applying unit 68 to apply the first standby voltage in forward bias with the calculated voltage value for a predetermined period of time.

In addition, the voltage controller 22A controls the voltage applying unit 68 to apply a second standby voltage, i.e., a voltage with a voltage value of 0 V.

The output unit 22D produces, as the detection results, for example, a radiographic image of the subject 12 based on the photocurrents obtained by the first obtaining unit 22B, and outputs the radiographic image to the display 64. The accepting unit 22G accepts from the input unit 62 a user's operation instruction of the input unit 62.

The third obtaining unit 22H measures a current value flowing when the first standby voltage is applied. Generally, it is known that in a pn diode the temperature of the pn diode can be calculated from the relationship between a bias voltage value in the forward-direction and a current value in the forward direction flowing at that time. The present inventors have found that in a photodetecting element 32 having a pn diode, too, the temperature of the photodetecting element 32 can be calculated from the relationship between a bias voltage value in the forward direction and a current value in the forward direction flowing at that time. The voltage at this time may be lower than the first standby voltage. Since the temperature of the photodetecting element 32 is calculated from these values, the third obtaining unit 22H measures a current value flowing when the first standby voltage is applied.

The third calculator 22I calculates the temperature of the photodetecting elements 32 from the first standby voltage value. Specifically, the third calculator 22I has the function of calculating the temperature of the photodetecting elements 32 from a first standby voltage value and a current value measured by the third obtaining unit. This temperature may be used instead of a temperature measured by the temperature detector 60. In addition, to improve temperature measurement accuracy, it is also possible to use a temperature measured by the temperature detector 60. Note that the third obtaining unit 22H and the third calculator 22*i* can be omitted.

Next, the procedure of a control process performed by the signal processing circuit 22 will be described.

Figure 8:
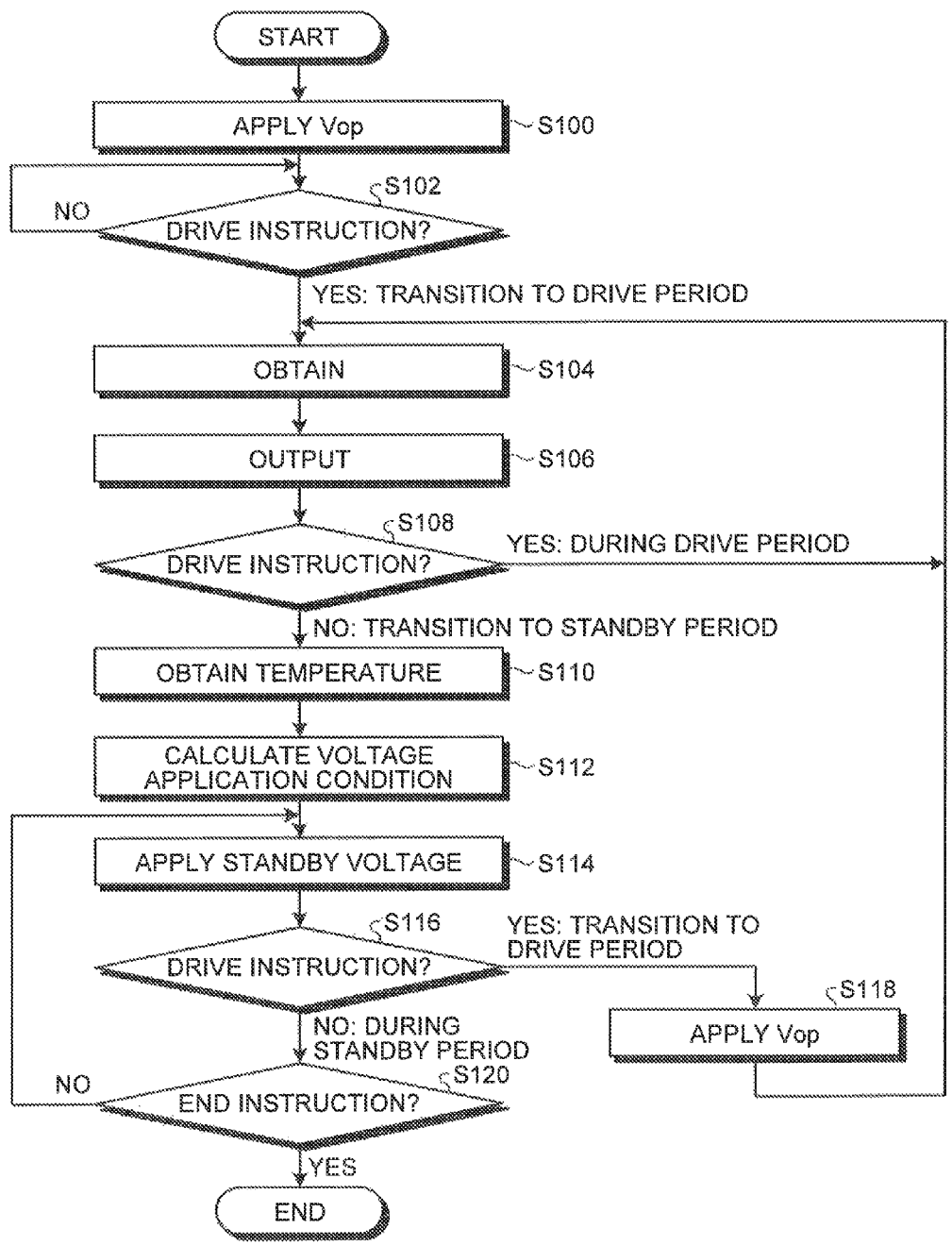
FIG. 8 is a flowchart illustrating the procedure of a detection process.

FIG. 8 is a flowchart illustrating the procedure of a detection process performed by the signal processing circuit 22. Note that FIG. 8 illustrates the procedure for the case in which the voltage controller 22A controls the voltage applying unit 68 to apply, as a standby voltage, the first standby voltage or the third standby voltage.

When the user operates a power switch which is not illustrated and then power is supplied to the apparatus components of the inspection apparatus 1, the voltage controller 22A controls the voltage applying unit 68 to apply the drive voltage Vop (step S100). The storage 66 prestores a drive voltage that has a voltage value whose absolute value is greater than or equal to an avalanche breakdown voltage of the pn junctions of the photodetecting elements 32 and that is in reverse bias with respect to the pn junctions. The voltage controller 22A reads the drive voltage Vop from the storage 66 and controls the voltage applying unit 68.

With the process at step S100, the voltage applying unit 68 starts the application of the drive voltage Vop to the photodetecting elements 32. When light enters the photodetecting elements 32 with the drive voltage Vop applied thereto, photocurrents according to the light detected by the photodetecting elements 32 are outputted to the signal processing circuit 22.

Then, the accepting unit 22G determines whether a drive instruction has been accepted from the input unit 62 (step S102). As described above, the drive instruction to obtain photocurrents may be a shooting instruction to produce a tomographic image.

The accepting unit 22G repeats a negative determination (step S102: No) until determining that a drive instruction has been accepted from the input unit 62 (step S102: Yes). If the accepting unit 22G determines that a drive instruction has been accepted (step S102: Yes), the signal processing circuit 22 determines that a transition from a startup state which is the start of activation to a drive period has been made, and thus, proceeds to step S104. Note that if a negative determination is made at step S102 (step 3102: No), the signal processing circuit 22 determines that a transition from a startup state to a standby period has been made, and thus, may proceed to step S110 which will be described later.

At step S104, the first obtaining unit 22B obtains photocurrents from the photodetecting elements 32. Then, the output unit 22D produces, as the detection results, for example, a radiographic image of the subject 12 from the photocurrents obtained at step S104, and outputs the radiographic image to the display 64 (step S106). Note that the output unit 22D may output, as the detection results, the photocurrents obtained at step S104 to the display 64. In addition, the output unit 22D may store the detection results in the storage 66.

Note that the processes at steps S104 and S106 are continuously performed for a predetermined period of time in which photocurrents are obtained by a single drive instruction (or shooting instruction). For example, when the inspection apparatus 1 produces a radiographic image of the subject 12 illustrated in FIG. 1, the processes are continuously performed for a period of time in which the light source 11 and the photodetector 10 make at least one rotation around the subject 12.

Then, the accepting unit 22G determines whether a drive instruction has been accepted from the input unit 62 (step S108). The determination at step S108 is the same as that at step S102.

If the accepting unit 22G determines that a drive instruction has been accepted from the input unit 62 (step S108: Yes), the signal processing circuit 22 determines that it is during a drive period, and thus, returns to step S104.

On the other hand, if the accepting unit 22G determines that a drive instruction is not accepted from the input unit 62 (step S108: No), the signal processing circuit 22 determines that a transition from the drive period to a standby period has been made, and thus, proceeds to step S110.

At step S110, the second obtaining unit 22C obtains the temperature of the photodetecting elements 32 for the drive period. Then, the first calculator 22E calculates a voltage application condition for generating Joule heat according to the temperature obtained at step S110 (step S112).

When the third standby voltage which is in reverse bias is applied during the standby period, at step S112 the first calculator 22E calculates, as a voltage application condition, a reverse-bias voltage value exceeding 0 V and being less than the drive voltage Vop. On the other hand, when the first standby voltage which is in forward bias is applied during the standby period, the first calculator 22E calculates, as a voltage application condition, a forward-bias voltage value. Note that, for the voltage application time, as an example, the case of using a predetermined value is described.

Note that identification information indicating which one of the first standby voltage, the second standby voltage, and the third standby voltage is used to control the voltage applying unit 68 during the standby period is prestored in the storage 66. Then, the first calculator 22E calculates a voltage application condition for the standby voltage (here, the first standby voltage or the third standby voltage) identified by the identification information stored in the storage 66.

Then, the voltage controller 22A controls the voltage applying unit 68 to apply the first standby voltage or the third standby voltage identified by the identification information, which is according to the voltage application condition calculated at step S112 (step S114).

With the process at step S114, the first standby voltage or the third standby voltage is applied to the photodetecting elements 32 during the standby period.

Then, the accepting unit 22G determines whether a drive instruction has been accepted from the input unit 62 (step S116). The determination at step S114 is the same as that at step S102.

If the accepting unit 22G determines that a drive instruction has been accepted from the input unit 62 (step S116: Yes), the signal processing circuit 22 determines that a transition from the standby period to a drive period has been made, and thus, proceeds to step S118. Then, the voltage controller 22A controls the voltage applying unit 68 to apply the drive voltage Vop (step S118) and returns to the above-described step S104.

On the other hand, if the accepting unit 22G determines that a drive instruction is not accepted from the input unit 62 (step S116: No), the signal processing circuit 22 determines that it is during a standby period, and thus, proceeds to step S120.

The accepting unit 22G determines whether an end instruction to end the process has been accepted from the input unit 62 (step S120). If the accepting unit 22G determines that an end instruction is not accepted (step S120: No), the signal processing circuit 22 determines that it is during a standby period, and thus, returns to step S114. On the other hand, if the accepting unit 22G determines that an end instruction has been accepted (step S120: Yes), the voltage application to the photodetecting elements 32 is cancelled and the routine ends.

Figure 9:
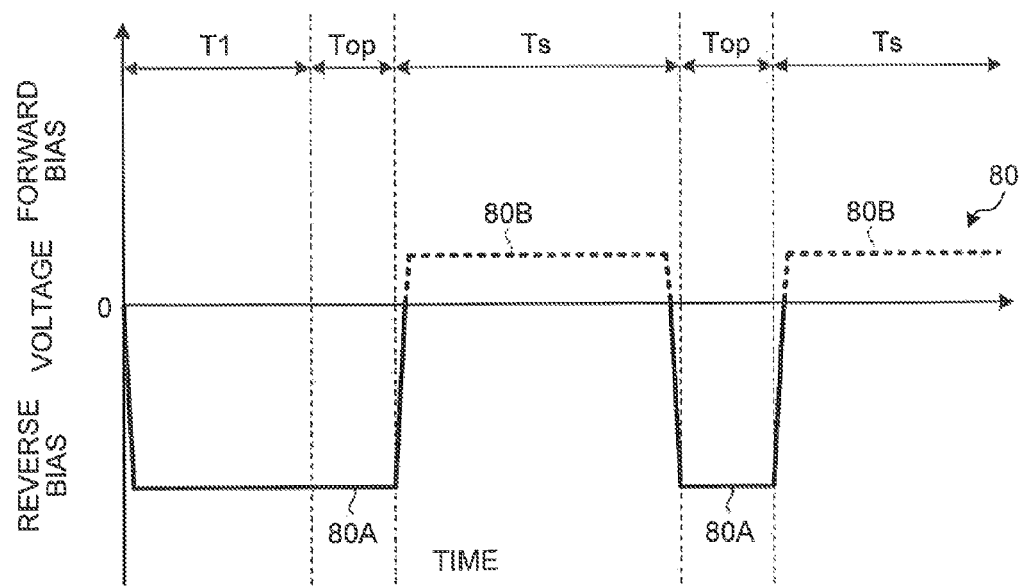
FIG. 9 is a diagram illustrating a time chart of a voltage.

FIG. 9 is a diagram illustrating a time chart of a voltage applied to the photodetecting elements 32. Note that FIG. 9 is a time chart for the case in which the signal processing circuit 22 performs the procedure of steps S100 to S120 and performs control to apply the first standby voltage in forward bias during the standby period.

As illustrated in FIG. 9, at a startup (see T1 in FIG. 9) and during a drive period (see Top in FIG. 9), the reverse-bias drive voltage Vop greater than or equal to an avalanche breakdown voltage Vbd of the pn junctions of the photodetecting elements 32 is applied (see a chart 80A in FIG. 9). Then, during a standby period (see Ts in FIG. 9), the first standby voltage in forward bias with respect to the pn junctions of the photodetecting elements 32 is applied (see a chart 80B in FIG. 9).

As described above, the photodetector 10 of the embodiment includes the photodetecting elements 32, the voltage applying unit 68, the first obtaining unit 22B, and the voltage controller 22A. Each photodetecting element 32 has a pn junction and outputs a photocurrent corresponding to detected light. The voltage applying unit 68 applies a voltage to the photodetecting elements 32. The first obtaining unit 22B obtains the photocurrents detected by the photodetecting elements 32. During a drive period in which photocurrents are obtained from the photodetecting elements 32, the voltage controller 22A controls the voltage applying unit 68 to apply a drive voltage Vop that has a voltage value whose absolute value is greater than or equal to an avalanche breakdown voltage Vbd of the pn junctions of the photodetecting elements 32 and that is in reverse bias with respect to the pn junctions of the photodetecting elements 32.

In addition, during a standby period in which photocurrents are not obtained from the photodetecting elements 32, the voltage controller 22A controls the voltage applying unit 68 to apply any of a first standby voltage, a second standby voltage, and a third standby voltage. The first standby voltage is a voltage in forward bias with respect to the pn junctions of the photodetecting elements 32. The second standby voltage is a voltage with a voltage value of 0 V. The third standby voltage is a voltage that has a voltage value whose absolute value is greater than 0 V and which is less than the drive voltage Vop, and that is in reverse bias with respect to the pn junctions of the photodetecting elements 32.

Therefore, the photodetector 10 of the embodiment can suppress a reduction in the sensitivity of the photodetecting elements 32.

Namely, when the voltage controller 22A controls the voltage applying unit 68 to apply the second standby voltage which is a voltage of 0 V, during the standby period the photodetecting elements 32 go into a state where no voltage is applied thereto. Hence, fluctuations in avalanche breakdown voltage Vbd caused by the continuous application of the drive voltage Vop can be suppressed, enabling to suppress a reduction in the sensitivity of the photodetecting elements 32.

In addition, when the voltage controller 22A controls the voltage applying unit 68 to apply the third standby voltage, due to the application of the third standby voltage in reverse bias, the photodetecting elements 32 generate Joule heat. The third standby voltage is in reverse bias whose absolute value is less than the drive voltage Vop. Hence, by the voltage controller 22A controlling the voltage applying unit 68 to apply the third standby voltage, fluctuations in the avalanche breakdown voltage Vbd of the photodetecting elements 32 can be suppressed while fluctuations in the temperature of the photodetecting elements 32 are suppressed.

In addition, when a forward-bias voltage is applied to the photodetecting elements 32, the photodetecting elements 32 generate larger Joule heat compared to the case in which a reverse-bias voltage with the same voltage value is applied to the photodetecting elements 32. Hence, when the voltage controller 22A controls the voltage applying unit 68 to apply the first standby voltage in forward bias with respect to the pn junctions of the photodetecting elements 32 during the standby period, by applying a voltage with a lower voltage value, fluctuations in the avalanche breakdown voltage Vbd of the photodetecting elements 32 can be suppressed while fluctuations in the temperature of the photodetecting elements 32 are suppressed.

Note that the embodiment describes the case of a configuration in which the scintillator 50 is provided on the light incident side of the photoelectric conversion layer 41 including the photodetecting elements 32. However, the photodetector 10 may not include the scintillator 50, and thus, the configuration of the photodetector 10 is not limited to one including the scintillator 50.

In addition, the embodiment describes the case in which the photodetector 10 is mounted on the inspection apparatus 1. However, the photodetector 10 is mountable on detection apparatuses that detect various types of light, and thus is not limited to being mounted on the inspection apparatus 1 that obtains tomographic images of the subject 12.

Note that a program for performing a detection process of the photodetector 10 in the above-described embodiment is preinstalled in a ROM, etc., and provided.

The program for performing the detection process of the photodetector 10 in the above-described embodiment may be configured to be provided by being recorded as a file in installable format or executable format in a computer-readable recording medium such as a CD-ROM, a flexible disk (FD), a CD-R, or a digital versatile disk (DVD).

Furthermore, the program for performing the detection process of the photodetector 10 in the above-described embodiment may be configured to be provided such that the program is stored in a computer connected to a network such as the Internet and downloaded via the network. Alternatively, the program for performing the detection process of the photodetector 10 in the above-described embodiment may be configured to be provided or distributed via a network such as the Internet.

The program for performing the detection process of the photodetector 10 in the above-described embodiment has a module configuration including the above-described components. For the actual hardware, a CPU (processor) reads and executes the program from the above-described ROM, by which each component is loaded into a main storage device and created in the main storage device.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A photodetector comprising:
a photodetecting element that has a pn junction and outputs a photocurrent corresponding to detected light;
a voltage applying unit that applies a voltage to the photodetecting element;
a first obtaining unit to obtain the photocurrent detected by the photodetecting element; and
a voltage controller to control the voltage applying unit to apply, during a drive period in which the photocurrent is obtained, a drive voltage and apply, during a standby period in which the photocurrent is not obtained, any of a first standby voltage, a second standby voltage with a voltage value of 0 V, and a third standby voltage, the drive voltage having a voltage value whose absolute value is equal to or greater than an avalanche breakdown voltage of the pn junction and being in reverse bias with respect to the pn junction, the first standby voltage being in forward bias with respect to the pn junction, and the third standby voltage having a voltage value whose absolute value is greater than 0 V and which is less than the drive voltage and being in reverse bias with respect to the pn junction.

2. The photodetector according to claim 1, comprising:
a second obtaining unit to obtain a temperature of the photodetecting element during the drive period; and
a first calculator to calculate a voltage application condition for allowing the photodetecting element to generate Joule heat according to the temperature, wherein
the voltage controller controls the voltage applying unit to apply one of the first standby voltage, the second standby voltage, and the third standby voltage according to the voltage application condition.

3. The photodetector according to claim 2, further comprising a temperature detector to measure a temperature of the photodetecting element, wherein
the second obtaining unit obtains a temperature of the photodetecting element during the drive period from the temperature detector.

4. The photodetector according to claim 2, further comprising a second calculator to calculate Joule heat generated in the photodetecting element during the drive period, based on time elapsed from a last transition from the standby period to the drive period and based on the drive voltage, wherein the first calculator calculates the voltage application condition for allowing the photodetecting element to generate Joule heat.

5. The photodetector according to claim 1, further comprising:

a third obtaining unit to measure a current value flowing when the first standby voltage is applied; and a third calculator to calculate a temperature of the photodetecting element based on the voltage value of the first standby voltage.

6. The photodetector according to claim 1, further comprising a scintillator provided on a light incident side of the photodetecting element and converting radiation into scintillation light.

* * * * *